Patented Mar. 29, 1932

1,851,418

UNITED STATES PATENT OFFICE

MAX BUCHNER, OF HANNOVER-KLEEFELD, GERMANY

PROCESS FOR THE PRODUCTION OF ALKALI METAL HYDROXIDE BY CONVERSION OF ALKALI METAL SALTS WITH ALKALINE EARTH METAL HYDROXIDE

No Drawing. Application filed May 9, 1927, Serial No. 190,128, and in Germany May 19, 1926.

This invention relates to the production of alkali hydroxide by reaction of alkali-metal fluorides with alkaline-earth hydroxides.

The new process consists in that the reaction is carried out but for a short time and that the lyes are separated as soon as the conversion-reaction becomes slower and before the reaction is complete.

In this manner comparatively large quantities of material can be conducted through the converting vessels in a time-unit; the apparatus is consequently considerably better utilized and the production is increased.

One proceeds preferably in such a manner that lye-concentrations of more than 200 gr. alkali-hydroxide are produced to the liter.

It is advisable to carry out the reaction at temperatures above 80° C.; preferably temperatures of approximately 100° C.

The use of alkali-salt in excess is favourable. Thus the caustic-lime or the equivalent is completely converted with certainty. The formation of a mud, difficult to handle, is prevented, said mud consisting for the greatest part of unconverted caustic-lime.

The reaction may be carried out continuously in several steps, for instance by providing a group of vessels. The reaction components, alkali-salt and caustic-lime, are introduced into the first vessel and the contents of the vessel are filtered after a short time. The solid conversion-product, together with the reaction-components which have not been converted, are conveyed into a second vessel, fresh quantities of liquid being further added. In this second vessel the conversion takes place at the same high speed as in the first vessel, as the soluble reaction-product which reduces the reaction-speed has been withdrawn. One obtains therefore rapidly comparatively high concentrations.

The lixiviations lyes are preferably used as reaction-liquid. When the conversion is carried through in several steps, the lixiviation lyes are conducted in counter-current to the caustic-lime or equivalents of the same, and in this manner a lasting and stronger concentration of the desired alkali-hydroxide is obtained and at the same time a more rapid reaction of the reaction-components.

Impurities may be precipitated from the strong alkali-hydroxide-solutions by bringing the caustic lime into contact with the strong alkali-hydroxide solutions which have been withdrawn. After this, the filtering is done and the filtered calcium-hydroxide is only then brought together with the alkali salt to be converted into hydroxide. When there is a group of reaction vessels, the caustic soda, which has been separated by filtration from the reaction in the second vessel, is brought together with calcium-hydroxide into the first reaction vessel. This caustic soda is then separated again from the calcium hydroxide by filtration, said calcium hydroxide containing then the impurities of the caustic soda. The residue obtained from this proceeding is introduced into the second vessel and the caustic soda obtained in the third vessel and alkali-salts are added. After a short time—i. e. as soon as the reaction becomes very slow—the contents of this second vessel are also filtered. Whilst the caustic soda is flowing into the first vessel, the residue is brought over into the third vessel and the caustic soda separated by filtration in a fourth vessel is added to the residue in the third vessel, so that also in this third vessel the reaction, which had not yet been completed, is carried out rapidly. The number of the several reaction vessels of one group will be increased according to requirement, so that the complete utilization of the reaction-components is ensured. The original pure lixiviation liquid is conducted in counter-current to the reaction components. A complete separation of the reaction products is thus ensured and at the same time the obtention of the same without remainder.

Claims:

1. The process of obtaining alkali metal hydroxides which comprises reacting in solution on alkali metal fluoride with alkaline-earth metal hydroxide at a temperature above 80° C. until the concentration of the solution retards the reaction, and then separating the solution before the reaction is complete.

2. The process of obtaining alkali metal hydroxides, which comprises reacting in solution with an excess of alkali metal fluoride on alkaline earth metal hydroxide until the reaction is retarded by the concentration of the solution and then separating the solution from the residues.

3. The process of obtaining alkali metal hydroxide, which comprises reacting in solution with alkali metal fluoride on alkaline earth metal hydroxide in a plurality of stages, moving the solution through the stages in a direction opposite to the reacting compound while in each stage the solution is separated from the residue before the completion of the reaction.

4. The process of obtaining alkali metal hydrate, which comprises reacting in solution with alkali metal fluoride upon a hydrate of an alkaline earth metal in several stages, the solution being transferred through the several stages in opposite direction to the reacting compounds, there being an excess of fluoride during the reactions and purifying the highly concentrated alkali metal hydrate solution with fresh alkaline earth hydrate.

In testimony whereof I affix my signature.

Dr. MAX BUCHNER.